United States Patent
Yang

(10) Patent No.: US 8,404,552 B2
(45) Date of Patent: Mar. 26, 2013

(54) MICROSCOPIC SPECTRUM APPARATUS

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 337 days.

(21) Appl. No.: 12/855,024

(22) Filed: Aug. 12, 2010

(65) Prior Publication Data

US 2011/0267616 A1    Nov. 3, 2011

(30) Foreign Application Priority Data

Apr. 29, 2010    (TW) ................. 99113753 A

(51) Int. Cl.
*H04N 5/225* (2006.01)
*G01J 3/28* (2006.01)

(52) U.S. Cl. .................. 438/335; 438/348; 356/326

(58) Field of Classification Search .................. 356/326, 356/319; 348/207.99, 205, 340, 373, 348, 348/345, 335; 359/372, 363, 368; 250/226, 250/216, 214 AG, 214 C
See application file for complete search history.

(56) References Cited

U.S. PATENT DOCUMENTS

| | | | | |
|---|---|---|---|---|
| 6,115,556 A | * | 9/2000 | Reddington | 396/267 |
| 6,363,220 B1 | * | 3/2002 | Ide | 396/98 |
| 6,441,958 B1 | * | 8/2002 | Yeung et al. | 359/372 |
| 6,700,613 B1 | * | 3/2004 | Bryant et al. | 348/342 |
| 7,112,779 B2 | * | 9/2006 | Suda et al. | 250/226 |
| 7,835,012 B1 | * | 11/2010 | Schweiger | 356/508 |
| 7,936,986 B2 | * | 5/2011 | Ichimiya | 396/98 |
| 2004/0169761 A1 | * | 9/2004 | Kawai et al. | 348/335 |
| 2008/0024650 A1 | * | 1/2008 | Nomura et al. | 348/348 |

* cited by examiner

*Primary Examiner* — Sang Nguyen
(74) *Attorney, Agent, or Firm* — Chun-Ming Shih; HDLS IPR Services

(57) ABSTRACT

A microscopic spectrum apparatus for connecting to an image capturing module which is used for converting external image light into electrical signal is disclosed. The microscopic spectrum apparatus includes a microscopic lens module, a spectrum analyzing module and a light beam splitter. The microscopic lens module is used for collecting the external image light to the image capturing module and magnifying the external image. The spectrum analyzing module is arranged at a side of the microscopic lens module. The light beam splitter is arranged between the microscopic lens module and the image capturing module, and is used for directing part of the external image light from the microscopic lens module to the spectrum analyzing module. In addition, a microscopic spectrum apparatus with image capturing capability is also disclosed.

8 Claims, 5 Drawing Sheets

MICROSCOPIC SPECTRUM APPARATUS

BACKGROUND OF THE INVENTION

1. Field of the Invention

This invention relates to a non-destructive testing apparatus, especially relates to a microscopic spectrum apparatus and a microscopic spectrum apparatus with image capturing capability.

2. Description of Related Art

Spectrometer is a kind of non-destructive testing instrument, which receives light emitted or reflected from an object to obtain the characteristic spectrum of the object. The material composition of the object can then be figured out by analyzing the characteristic spectrum. Applications of the spectrometers include quality testing of products, pollution testing on air or water, or anti-counterfeiting testing on bill for criminal identification purpose.

Conventional spectrometers usually have significant weights and volumes, and cannot be easily moved to where the object is. Instead, users have to take more inconvenient measure to sample the object and then bring it to the spectrometer for analyzing. Accordingly, handy-sized spectrometers have been introduced to the market in recent years to overcome the inconvenience. The handy-sized spectrometers adopt novel gratings or small MEMS devices as their core components so as able to be downsized for easier carrying.

However, more and more applications intend to investigate the material composition on specific smaller regions of the object. Those regions may be too small to be directly observed by naked human eye. Therefore, such applications can only be performed with the assistance of microscopes. However, the significant weights and volumes of traditional microscopes make it impossible to be carried with the handy-sized spectrometers in practical use. Therefore, it becomes an important issue in this industry to provide a portable microscopic spectrum apparatus capable to solve the above mentioned problem.

SUMMARY OF THE INVENTION

Accordingly, it is an objective of the present invention to provide a microscopic spectrum apparatus which is capable of being easily carried.

In order to achieve the objective, a microscopic spectrum apparatus for connecting to an image capturing module which is used for converting external image light into electrical signal is provided. The microscopic spectrum apparatus includes a microscopic lens module, a spectrum analyzing module and a light beam splitter. The microscopic lens module is used for collecting the external image light to the image capturing module and magnifying the external image. The spectrum analyzing module is arranged at a side of the microscopic lens module. The light beam splitter is arranged between the microscopic lens module and the spectrum analyzing module, and used for directing part of the external image light from the microscopic lens module to the spectrum analyzing module.

It is another objective of the present invention to provide a microscopic spectrum apparatus with image capturing capability which is capable of being easily carried.

In order to achieve the objective, a microscopic spectrum apparatus with image capturing capability including an image capturing module, a microscopic lens module, a spectrum analyzing module and a light beam splitter. The image capturing module is used for converting external image light into electrical signal. The microscopic lens module is used for collecting the external image light to the image capturing module and magnifying the external image. The spectrum analyzing module is arranged at a side of the microscopic lens module. The light beam splitter is arranged between the microscopic lens module and the spectrum analyzing module, and used for directing part of the external image light from the microscopic lens module to the spectrum analyzing module.

BRIEF DESCRIPTION OF THE DRAWINGS

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
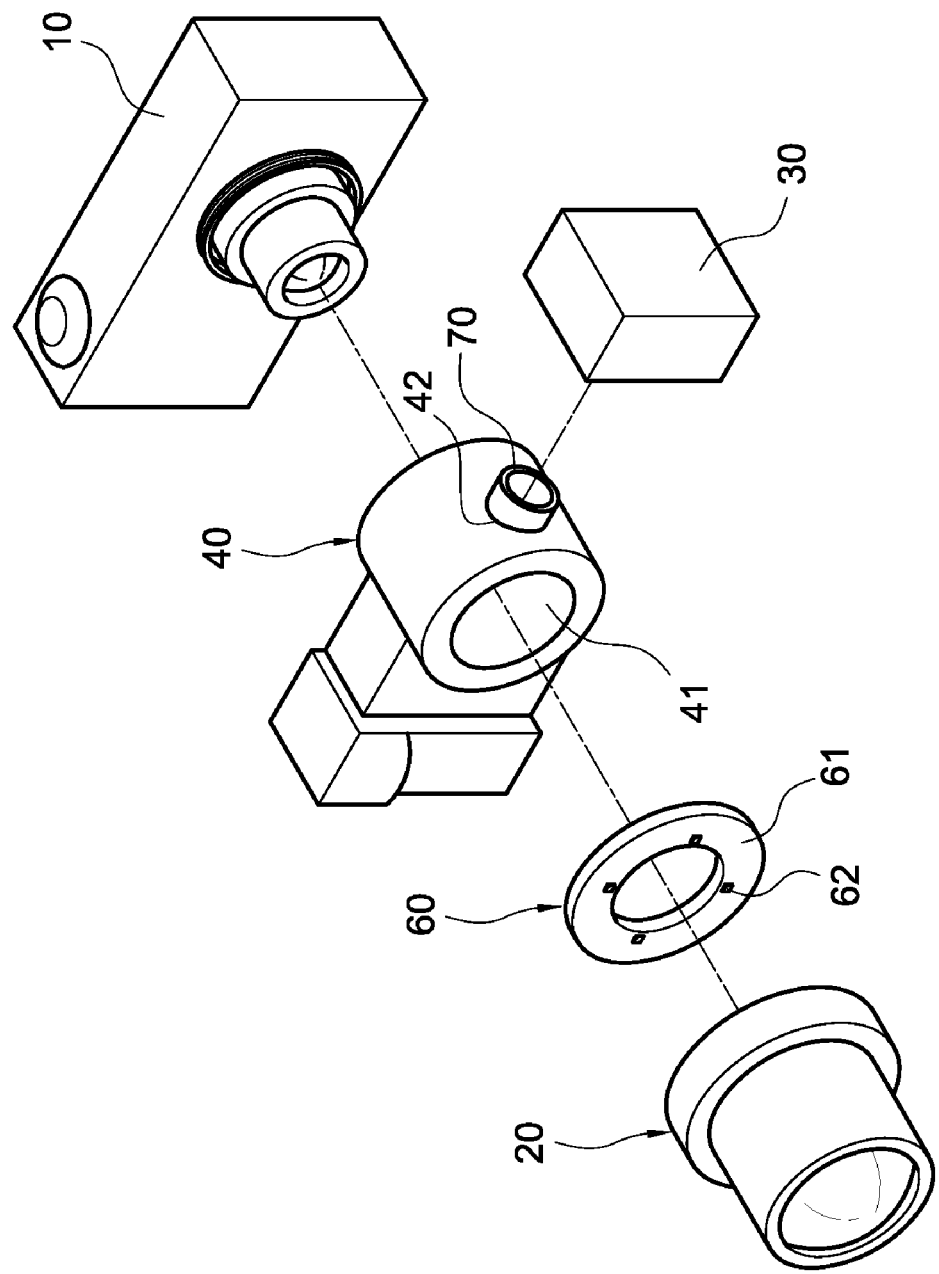
FIG. 1 illustrates schematic view of a microscopic spectrum apparatus according to the first embodiment of the present invention.

The present invention is described below in detail with reference to accompanying drawings. It should be noted that like elements are denoted by the same reference numerals throughout the disclosure.

Figure 2:
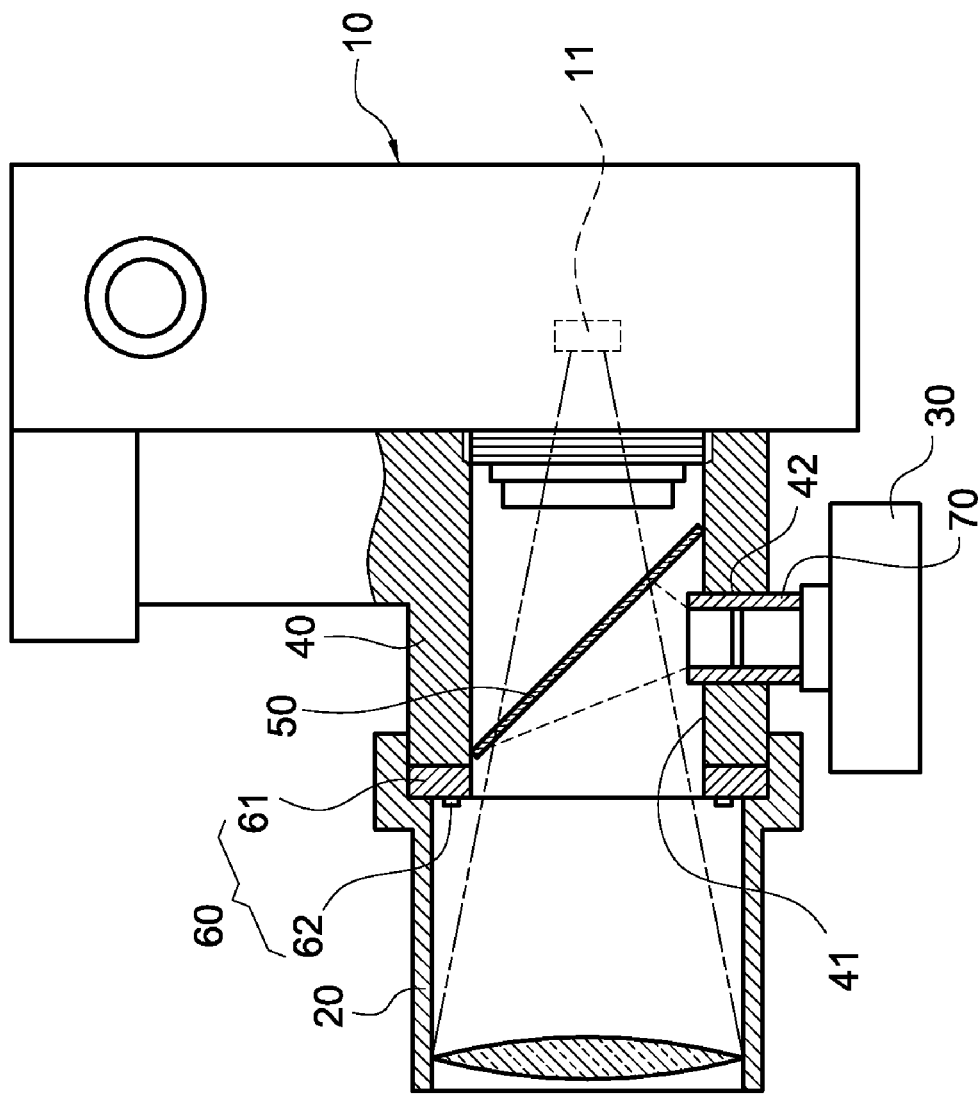
FIG. 2 illustrates cross-sectional view of a microscopic spectrum apparatus according to the first embodiment of the present invention.

FIG. 1 and FIG. 2 illustrate a microscopic spectrum apparatus according to the first embodiment of the present invention. The microscopic spectrum apparatus is used for connecting to an image capturing module 10. The image capturing module 10 has an opto-electronic conversion unit 11, which is used for converting external image light into electrical signal. In this embodiment, the image capturing module 10 is, but not limited to, a commercial digital camera. In practical use, the image capturing module can be various kinds of image capturing apparatus, or the compact camera module on portable electronic apparatus.

The microscopic spectrum apparatus includes a microscopic lens module 20, a spectrum analyzing module 30, an adapter 40, a light beam splitter 50, and a light emitting module 60. The microscopic lens module 20 has at least one lens therein, and is used for collecting the external image light to the opto-electronic conversion unit 11 of the image capturing module 10 and magnifying the external image. The spectrum analyzing module 30 is arranged at a side of the microscopic lens module 20. The type and the corresponding spectrum range of the spectrum analyzing module 30 have not specific limitation, and can be adopted according to the practical situation.

The adapter 40 is detachably connected between the image capturing module 10 and the microscopic lens module 20. The adapter 40 is of tubular shape and has a tunnel 41 connecting the image capturing module 10 to the microscopic lens module 20. The light beam splitter 50 is arranged in the tunnel 41 and located between the image capturing module 10 and the microscopic lens module 20. The light beam splitter 50 can be a beam splitter plate, a beam splitter cube or a beam splitter filter. A through hole 42 communicating to the tunnel 41 is formed on a side of the adapter 40. The light beam splitter 50 directs part of the external image light from the microscopic lens module 20 to the spectrum analyzing module 30 via the tunable aperture 70 in the through hole 42.

In order to control the field of view of the spectrum analyzing module 30, a tunable aperture 70 is arranged in the through hole 42. By adjusting the aperture size of the tunable aperture 70, the field of view of the spectrum analyzing module 30 can be controlled as needed.

Besides, because the microscopic lens module 20 needs to be placed adjacent to the object to be shot, ambient light is consequently blocked by the microscopic lens module 20 and shadow is formed on the object as to affect image capturing. The present invention provides a light emitting module 60 arranged between the adapter 40 and the microscopic lens module 20. In this embodiment, the light emitting module 60 has a circular-shaped circuit board 61 and a plurality of light emitting devices 62 arranged on the circuit board 61.

Figure 3:
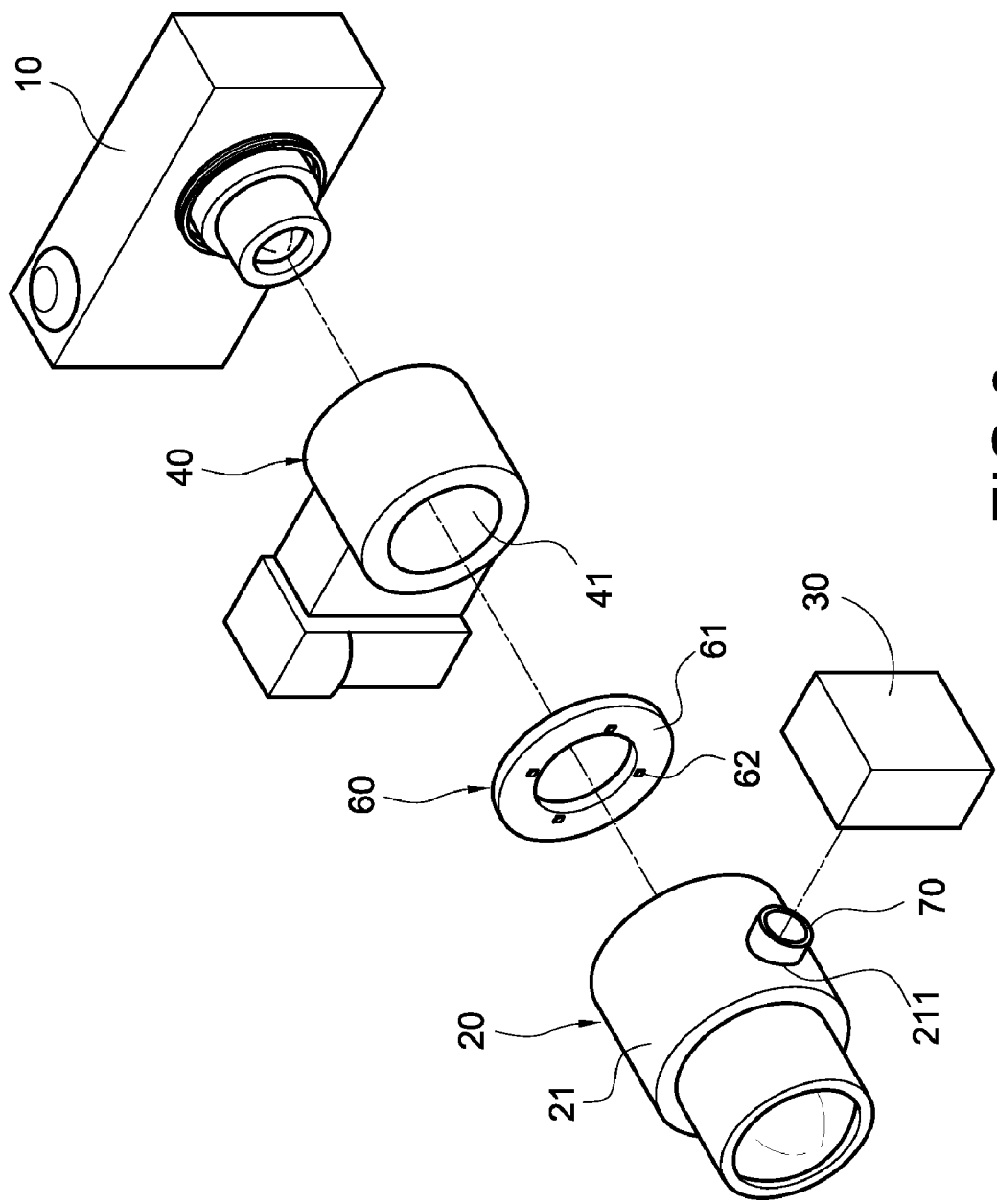
FIG. 3 illustrates schematic view of a microscopic spectrum apparatus according to the second embodiment of the present invention.
Figure 4:
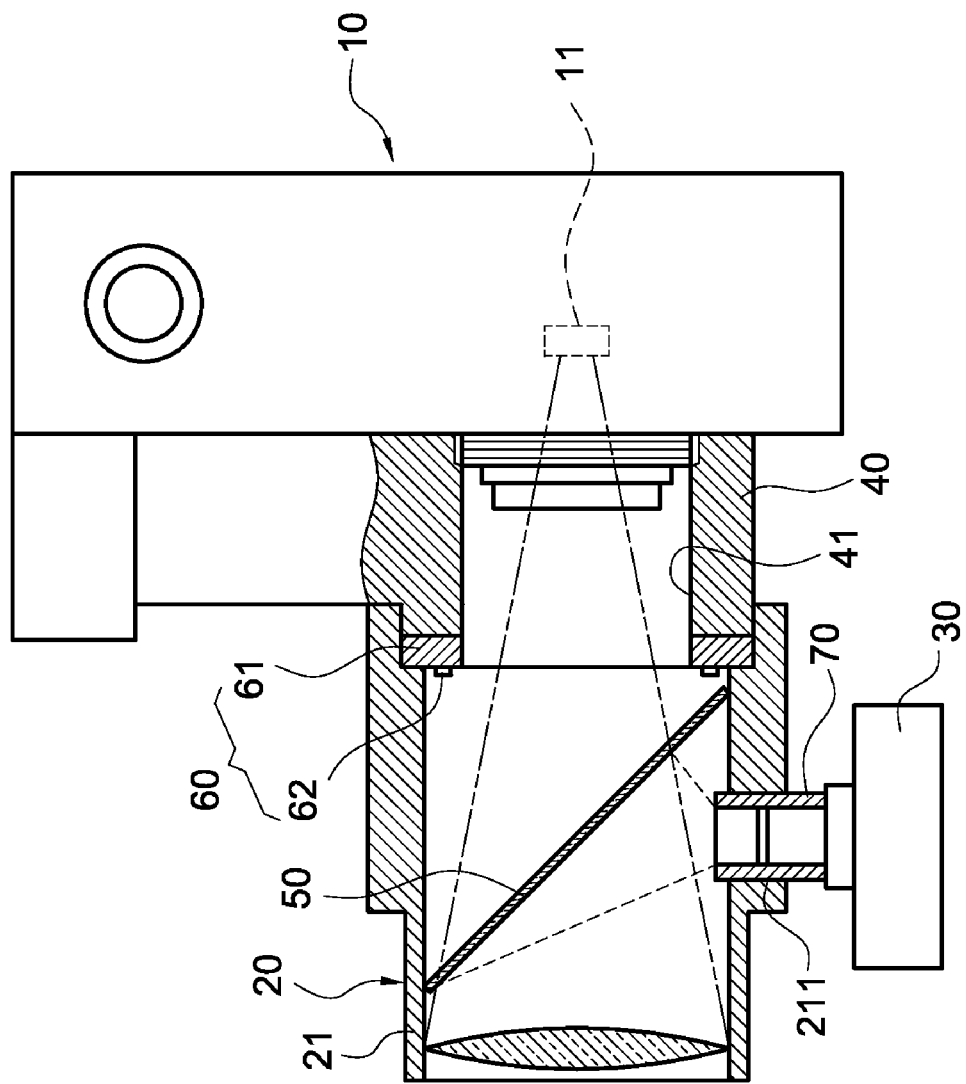
FIG. 4 illustrates cross-sectional view of a microscopic spectrum apparatus according to the second embodiment of the present invention.

FIG. 3 and FIG. 4 illustrate a microscopic spectrum apparatus according to the second embodiment of the present invention. The second embodiment is substantial the same as the first embodiment and description of the same or similar features according the above description are omitted here. The major difference is that the spectrum analyzing module 30 is arranged adjacent to the microscopic lens module 20. A lens barrel 21 is provided for containing the microscopic lens module 20 and the light beam splitter 50. A through hole 211 corresponding to the light beam splitter 50 is formed on a side of the lens barrel 21. The tunable aperture 70 used for controlling the field of view of the spectrum analyzing module 30 is arranged in the through hole 211. The light beam splitter 50 directs part of the external image light from the microscopic lens module 20 to the spectrum analyzing module 30 via the tunable aperture 70 in the through hole 211.

Figure 5:
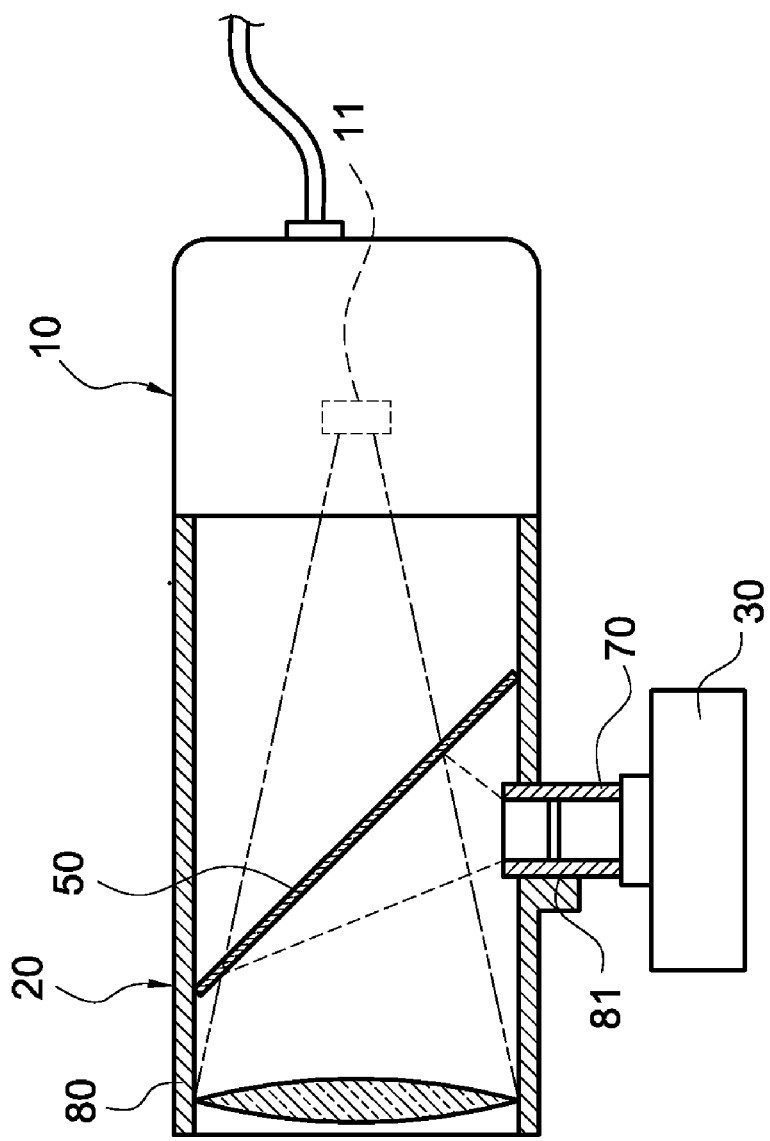
FIG. 5 illustrates cross-sectional view of a microscopic spectrum apparatus with image capturing capability according to an embodiment of the present invention.

FIG. 5 illustrates a microscopic spectrum apparatus with image capturing capability according to an embodiment of the present invention. This embodiment is slightly different from the above two embodiments of the microscopic spectrum apparatus. The two embodiments are designed for connecting to an image capturing module like commercial digital camera or a compact camera module on portable electronic apparatus. This embodiment integrates an image capturing module into the microscopic spectrum apparatus. A microscopic spectrum apparatus with image capturing capability is described below.

The microscopic spectrum apparatus with image capturing capability includes an image capturing module 10, a microscopic lens module 20, a spectrum analyzing module 30, a light beam splitter 50, and a housing 80 used for containing the image capturing module 10, the microscopic lens module 20 and the light beam splitter 50. The image capturing module 10 is used for converting external image light into electrical signal and outputting the electrical signal to display devices like computer monitor or television set. The microscopic lens module 20 is used for collecting the external image light to the image capturing module 10 and magnifying the external image. The spectrum analyzing module 30 is arranged at a side of the microscopic lens module 20. The light beam splitter 50 is arranged between the microscopic lens module 20 and the spectrum analyzing module 30 and used for directing part of the external image light from the microscopic lens module 20 to the spectrum analyzing module 30. A through hole 81 corresponding to the light beam splitter 50 is formed on a side of the housing 80. A tunable aperture 70 used for controlling the field of view of the spectrum analyzing module 30 is arranged in the through hole 81. The light beam splitter 50 directs part of the external image light from the microscopic lens module 20 to the spectrum analyzing module 30 via the tunable aperture 70 in the through hole 81.

While the invention has been described by means of specific embodiments, numerous modifications and variations could be made thereto by those skilled in the art without departing from the scope and spirit of the invention set forth in the claims.

What is claimed is:

1. A microscopic spectrum apparatus for connecting to an image capturing module, the image capturing module used for converting external image light into electrical signal, the microscopic spectrum apparatus comprising:
   a microscopic lens module for collecting the external image light to the image capturing module and magnifying the external image;
   a spectrum analyzing module arranged at a side of the microscopic lens module; and
   a light beam splitter arranged between the microscopic lens module and the image capturing module, and used for directing part of the external image light from the microscopic lens module to the spectrum analyzing module; and
   a light emitting module arranged between an adapter and the microscopic lens module, wherein the light emitting module comprises a circular circuit board and a plurality of light emitting devices arranged on the circular circuit board.

2. The microscopic spectrum apparatus as claim 1, wherein the adapter is detachably connected between the image capturing module and the microscopic lens module, the adapter having a tunnel connecting the image capturing module to the microscopic lens module, wherein the light beam splitter is arranged in the tunnel.

3. The microscopic spectrum apparatus as claim 2, wherein a through hole communicating to the tunnel is formed on a side of the adapter, and a tunable aperture used for controlling the field of view of the spectrum analyzing module is arranged in the through hole, and the light beam splitter directs part of the external image light from the microscopic lens module to the spectrum analyzing module via the tunable aperture in the through hole.

4. The microscopic spectrum apparatus as claim 1, further comprising a lens barrel used for containing the microscopic lens module and the light beam splitter.

5. The microscopic spectrum apparatus as claim 4, wherein a through hole corresponding to the light beam splitter is formed on a side of the lens barrel, and a tunable aperture used for controlling the field of view of the spectrum analyzing module is arranged in the through hole, and the light beam splitter directs part of the external image light from the microscopic lens module to the spectrum analyzing module via the tunable aperture in the through hole.

6. The microscopic spectrum apparatus as claim 1, wherein the light beam splitter is a beam splitter plate, a beam splitter cube or a beam splitter filter.

7. A microscopic spectrum apparatus with image capturing capability, comprising:
   an image capturing module for converting external image light into electrical signal;
   a microscopic lens module for collecting the external image light to the image capturing module and magnifying the external image;

a spectrum analyzing module arranged at a side of the microscopic lens module; and a light beam splitter arranged between the microscopic lens module and the image capturing module, and used for directing part of the external image light from the microscopic lens module to the spectrum analyzing module; and a housing used for containing the image capturing module, the microscopic lens module and the light beam splitter, wherein a through hole corresponding to the light beam splitter is formed on a side of the housing, and a tunable aperture used for controlling the field of view of the spectrum analyzing module is arranged in the through hole, and the light beam splitter directs part of the external image light from the microscopic lens module to the spectrum analyzing module via the tunable aperture in the through hole.

8. The microscopic spectrum apparatus with image capturing capability as claim 7, wherein the light beam splitter is a beam splitter plate, a beam splitter cube or a beam splitter filter.

* * * * *